United States Patent [19]

Toyoshima et al.

[11] Patent Number: 5,032,459
[45] Date of Patent: Jul. 16, 1991

[54] MODIFIED POLYOLEFIN RESIN

[75] Inventors: Yoshiki Toyoshima; Mitsuyuki Okada, both of Ichihara; Takeshi Fujii, Chiba; Kentaro Yamaguchi; Mitsuji Tsuji, both of Ichihara; Hideo Shinonaga, Chiba, all of Japan

[73] Assignee: Sumitomo Chemical Company, Limited, Osaka, Japan

[21] Appl. No.: 577,818

[22] Filed: Sep. 4, 1990

Related U.S. Application Data

[63] Continuation of Ser. No. 487,131, Mar. 1, 1990, abandoned, which is a continuation-in-part of Ser. No. 273,473, Nov. 21, 1988, abandoned.

[30] Foreign Application Priority Data

Nov. 29, 1987 [JP] Japan .................................. 62-294750

[51] Int. Cl.$^5$ ...................... C08L 51/04; C08L 51/06; C08L 23/26; B32B 27/08
[52] U.S. Cl. ............................. 428/424.8; 428/424.2; 525/193; 525/285; 525/286; 525/301
[58] Field of Search ............................. 525/193, 286; 428/424.8

[56] References Cited

U.S. PATENT DOCUMENTS

| | | | |
|---|---|---|---|
| 3,708,555 | 1/1973 | Gaylord | 260/878 R |
| 3,719,731 | 3/1973 | Schuster et al. | 260/878 R |
| 3,868,433 | 2/1975 | Bartz et al. | 525/285 |
| 4,612,249 | 9/1986 | Packer et al. | 428/424.4 |
| 4,619,972 | 10/1986 | Inoue et al. | 525/193 |
| 4,762,882 | 8/1988 | Okano | 525/285 |
| 4,816,340 | 3/1989 | Doi et al. | 428/424.4 |

FOREIGN PATENT DOCUMENTS 2023154  11/1970  Fed. Rep. of Germany.
1939894   2/1971  Fed. Rep. of Germany.

Primary Examiner—Carman J. Seccuro
Attorney, Agent, or Firm—Stevens, Davis, Miller & Mosher

[57] ABSTRACT

According to the present invention, there is provided a modified polyolefin resin having the following merits:

(1) The amount of bound unsaturated carboxylic acid, a derivative thereof of unsaturated epoxy compound is high.
(2) The change of the melt flow rate during the modification is small.
(3) The physical properties are of high grade.
(4) The coating affinity with urethane coatings and resistance to falling off of the coating layer are excellent.

The modified polyolefin resin of the present invention can be used for adhesives, covering materials, binders, laminate bonding agent and polymer alloy constituents.

14 Claims, No Drawings

MODIFIED POLYOLEFIN RESIN

CROSS-REFERENCE TO RELATED APPLICATIONS

This application is a continuation of application Ser. No. 07/487,131, filed Mar. 1, 1990, which in turn is a continuation-in-part of application Ser. No. 07/273,473, filed Nov. 21, 1988, both now abandoned.

The present invention relates to a polyolefin resin modified with at least one unsaturated carboxylic acids, derivatives thereof or unsaturated epoxy compounds.

Polypropylene and polyethylene are typical polyolefin resins. Since such resins have many advantages in physical, chemical and mechanical properties and in processability, and attain economical benefits, they are used in industry in a wide field.

However, it is difficult to prepare a composite material and a laminate consisting of a polyolefin resin and metals, glass or polar polymers. Because the resin has a non-polar property and has poor adhesiveness or affinity with the above constituents.

For this reason, modification of polyolefin resins has been well known and widely taken into practice. The modification comprises grafting an unsaturated carboxylic acid or its derivative, acrylic acid or maleic anhydride for example, onto a polyolefin resin. As a result, polar groups are introduced in the chain of resin molecule.

However, the conventional modification has some disadvantages. It leaves much monomer unreacted in the modified product due to the low graft efficiency of the unsaturated carboxylic acid or its derivative. Additionally, it gives a modified product of low grade due to the drastic change in melt flow rate during the graft reaction.

In order to avoid the disadvantages, JP-A-55-50040 has proposed a process comprising admixing a rubber to a polyolefin resin. JP-A-53-1291 has proposed a process comprising kneading a polyolefin resin in the presence of an aromatic hydrocarbon containing a tertiary or secondary alkyl or an aromatic hydrocarbon containing at least three primary alkyls. And JP-A-52-93495 has proposed a process comprising subjecting a polyolefin resin to a free-radical reaction in the presence of a polyalkylbenzene.

Although the graft amount can be improved according to the process disclosed in JP-A-55-50040, the process requires divisional addition of the graft monomer and free-radical initiator and needs a long period of reaction time. These features are not economically beneficial. Moreover the process accompanies another demerit that it gives a modified product having too high melt flow rate.

Although the process disclosed in JP-A-53-1291 exhibits an advantageous effect when it is applied to a crosslinked polyolefin composed mainly of ethylene, the reference contains no examplary disclosure about the decomposable polyolefin composed mainly of propylene and no advantageous effect is expected in this case.

Although the graft amount can be improved according to the process disclosed in JP-A-52-93495, the reference is quite silent about the change of the fluidity (melt flow rate) of the product after the graft modification and no advantageous effect is expected. Moreover the process accompanies another demerit that the meltkneading process gives a modified product containing polyalkylbenzene as an impurity since polyalkylbenzene has a high boiling point.

U.S. Pat. No. 3,708,555, a patent family of JP-A-46-1679, proposes a process comprising allowing to react a mixture of maleic anhydride and styrene with a polyolefin resin or a rubber. However, in the process, a large amount of styrene compared with maleic anhydride is required and no free-radical initiator is used. As a result, the modified product thus obtained has a small graft amount of maleic anhydride and contains a large amount of maleic anhydride unreacted. Moreover it has a low adhesiveness and is hardly applied with a coating. Accordingly the modified product shows a low mechanical strength and cannot be of practical use.

The object of the present invention is to provide a modified polyolefin resin having a high graft amount of unsaturated compounds, adhesiveness, affinity for coating, resistance to falling off of the coating and other desirable properties. The modified polyolefin resin is obtained by melt-kneading a mixture consisting of a polyolefin resin and a solid rubber, at least one compound selected from the group consisting of unsaturated carboxylic acids, the derivatives thereof and unsaturated epoxy compounds, an unsaturated aromatic monomer and a free-radical initiator in a specific ratio. And the process has an advantage that the fluidity of the resin (melt flow rate) is almost maintained during the melt-kneading.

According to the present invention, there is provided a modified polyolefin resin obtained by melt-kneading a mixture consisting of 100 parts by weight of a mixture consisting of (A) 40–99% by weight of a polyolefin resin having a melt flow rate of 0.05–60 g/10 min and (B) 60–1% by weight of a solid rubber having a number-average molecular weight of 10,000–200,000, (C) 0.1–5 parts by weight of at least one compound selected from the group consisting of unsaturated carboxylic acids, the derivatives thereof and unsaturated epoxy compounds, (D) 0.1–5 parts by weight of an unsaturated aromatic compound and (E) 0.01–2 parts by weight of a free-radical initiator, the molar ratio of (C)/(D) ranging from 1/0.1 inclusive to 1/1 exclusive.

As the polyolefin resin (A) having a melt flow rate of 0.05–60 g/10 min, various olefin homopolymers and olefin copolymers can be used. Specific examples thereof are low-density polyethylene, linear low-density polyethylene, high-density polyethylene, crystalline polypropylene, crystalline propylene copolymer (crystalline propylene-ethylene random copolymer, crystalline propylene-ethylene block copolymer, propylene-butene-1 copolymer, propylene-4-methylpentene-1 copolymer, propylene-ethylene-butene-1 terpolymer), polybutene-1, poly-4-methylpenten ethylene-vinyl acetate copolymer, ethylene-methyl methacrylate copolymer, ethylene-methylacrylate copolymer, ethylene-ethyl methacrylate copolymer ethylene-ethylacrylate copolymer, ethylene-butyl methacrylate copolymer ethylene-butylacrylate copolymer, ethylene-methacrylic acid copolymer, ethylene-acrylic acid copolymer and the partial metal salt thereof, ethylene-methacrylic acid-methacrylic acid ester terpolymer, ethylene-methacrylic acid-acrylic acid ester terpolymer, ethylene-acrylic acid-methacrylic acid ester terpolymer, ethylene-acrylic acid-acrylic acid ester terpolymer ethylene-vinyl alcohol copolymer, ethylene-vinyl acetate-vinyl alcohol terpolymer and ethylene-styrene copolymer. These polyolefin resins can be used alone or in admixture thereof.

The melt flow rate of the polyolefin resin (A) falls in the range of 0.05–60 g/10 min, preferably 0.1–50 g/10 min. However, it may be controlled so that the melt flow rate of the modified polyolefin resin falls in the range of 0.1–100 g/10 min.

Consequently the more preferable range of the melt flow rate of the polyolefin resin (A) is 0.1–40 g/10 min for decomposable polyolefin resins such as crystalline polypropylene, crystalline propylene-ethylene random copolymer, polybutene-1, poly-4-methylpentene-1 and the like. It is 1–50 g/10 min for crosslinked polyolefin resins such as polyethylene, ethylene-vinyl acetate copolymer, ethylene-methacrylic acid ester copolymer, ethylene-acrylic acid copolymer, ethylene-vinyl alcohol copolymer and the like.

The melt flow rate is determined in accordance with ASTM D 1238. It is measured under the conditions of 230° C. and a load of 2.16 kg for polypropylene resins, 190° C. and a load of 2.16 kg for polyethylene and polybutene-1 resins and 260° C. and a load of 5 kg for poly-4-methylpentene-1 resins.

When the melt flow rate of the polyolefin resin (A) is lower than 0.05 g/10 min, the production of modified polyolefin is difficult due to its low fluidity. By contrast when it is higher than 60 g/10 min, the mechanical properties of the modified polyolefin resin is undesirably lowered.

In the present invention, the number average molecular weight of the polyolefin resin (A) is preferably 7,000–800,000, more preferably 10,000–700,000.

In the polyolefin resin (A) of the present invention, the expression "polypropylene" refers to propylene homopolymer, block copolymer and random copolymer of propylene and at least one alpha-olefin. The block copolymer can be produced by a process comprising polymerizing propylene at the first step and copolymerizing the resulting reactive polypropylene with ethylene and/or at least one alpha-olefin such as butene-1 at the second step, for example. The random copolymer can be produced by copolymerizing propylene with ethylene and/or at least one alphaolefin such as butene-1.

The above polymers can be produced by allowing to react the starting materials in the presence of the so-called Ziegler-Natta catalyst. Ziegler-Natta catalyst is a chemical complex of titanium trichloride and an alkyl-aluminum compound, for example.

The polymerization can be carried out at a temperature of 0°–300° C. However, it is usually carried out at 0°–100° C., because an elevated temperature of higher than 100° C. inhibits the production of highly stereoregular polymers.

The polymerization pressure is not critical. It is usually 3–100 atm in view of the practicality and cost effectiveness.

The polymerization can be carried out by a continuous process or a batch process.

It can be practiced by any of slurry polymerization, solution polymerization, bulk polymerization and gas phase polymerization. The slurry polymerization is carried out in an inert hydrocarbon solvent such as butane, pentane, hexane, heptane, octane etc. In the solution polymerization, the produced polymer is dissolved in the inert hydrocarbon solvent mentioned above. In the bulk polymerization, the polymerization is carried out in a liquid monomer without solvent. And in the gas phase polymerization, the polymerization is carried out in a gaseous monomer.

In order to control the molecular weight of the product, chain transfer agents such as hydrogen can be added at the polymerization.

The polypropylene used in the present invention can be produced with an isospecific Ziegler-Natta catalyst. Preferable are those having a high isospecificity.

More preferable are those containing a solid complex of titanium trichloride having a layer crystal structure or a magnesium compound and a titanium compound as the transition metal constituent and an organoaluminum compound as the typical metal constituent. And the catalyst may further contain a known compound having an electron-donating property as the third component.

Titanium trichloride used can be prepared by reducing titanium tetrachloride with a reducing agent of wide variety. Metals such as aluminum and titanium, hydrogen and organometal compounds have been known as the reducing agent. $TiCl_3AA$ is one of the typical examples of the titanium trichloride compositions produced through metal reduction. It is prepared by reducing titanium tetrachloride with metallic aluminum followed by pulverizing the reduction product with a ball mill or an vibration mill. Due to the process, it contains activated aluminum chlorides. The isospecificity, polymerization activity and particle shape of the $TiCl_3AA$ may be improved when a compound selected from ethers, ketones, esters, aluminum chloride and titanium tetrachloride is added during the pulverization.

When severe demands for heat resistance, stiffness and scratch resistance are encountered on the modified polyolefin resin of the present invention, it is preferable to use a highly crystalline polypropylene having the following properties:

(1) An isotactic pentad of boiling heptane insoluble of propylene homopolymer portion of 0.970 or more, wherein the propylene homopolymer portion refers to the homopolymer portion of polypropylene or the homopolymer portion of propylene block copolymer which has been prepared as the first segment in the first step of the block polymerization process, (2) A boiling heptane soluble of not more than 5.0% by weight and (3) A 20° C. xylene soluble of not more than 2.0% by weight.

The isotactic pentad of boiling heptane insoluble, boiling heptane soluble and 20° C. xylene soluble are determined as follows:

(1) 20° C. Cold xylene soluble

5 Grams of polypropylene are dissolved in 500 ml of boiling xylene. Then the mixture is cooled to 20° C. and allowed to stand for 4 hours. Thereafter the mixture is filtered to remove the 20° C. xylene insoluble. Xylene is removed from the filtrate by a simple evaporation and then evaporation under reduced pressure at 60° C. to obtain a solidified 20° C. xylene soluble. The 20° C. xylene soluble is determined by dividing the dry weight of the solidified 20° C. xylene soluble by the weight of the sample used and it is represented by percent.

(2) Boiling heptane soluble

The above 20° C. xylene insoluble is dried and extracted with boiling n-heptane in a Soxhlet apparatus for 8 hours. Thus obtained residue is referred to as boiling heptane insoluble. The boiling heptane soluble is determined by subtracting the dry weight of the boiling heptane insoluble from the weight of the sample used (5 g) and dividing the resulting value by the weight of the sample used. It is also represented by percent.

(3) Isotactic pentad

Isotactic pentad referes to the fraction of a series of five successive isotactically-sequenced propylene monomer units in the total polymer chain. It is determined based on $^{13}$C-NMR measurements as disclosed in A. Zambelli et al., Macromolecules, 6, 925 (1973). And the NMR absorption peaks are assigned based on the subsequently published Macromolecules, 8, 687 (1975).

Specifically, the isotactic pentad is determined based on the relative ratio of the area of mmmm peaks to the total area of the absorption peaks assigned to methyl carbons. Applying the method to the NPL standard substance CRM No. M19-14 Polypropylene PP/MWD/2 provided by The National Physical Laboratory (United Kingdom) gave an isotactic pentad of 0.944.

The above-mentioned highly crystalline polypropylene can be obtained by any of the methods disclosed in JP-A-60-28405, JP-A-60-228504, JP-A-61-218606 and JP-A-61-287917.

When severe demands for impact resistance are encountered on the modified polyolefin resin of the present invention, it is preferable to use a propylene block copolymer, which contains propylene homopolymer portions prepared in the first step as the first segment and block copolymer portions of propylene and an alphaolefin such as ethylene and butene-1 prepared in the second step of the block polymerization process as the second segment.

The propylene block copolymer can be prepared by slurry polymerization or gas phase polymerization. When severe demands for high impact resistance are encountered, the amount of the second segment should be raised. For this purpose, the gas phase polymerization method is preferably applied.

Such polypropylene having a high impact resistance can be obtained by the gas phase polymerization disclosed in JP-A-287917 for example.

In the propylene block copolymer, the propylene homopolymer portion prepared in the first step of the polymerization may consist of propylene monomer units only or may consist of propylene monomer units and alpha-olefin monomer units such as ethylene or an alpha-olefin having 4-6 carbon atoms, wherein the content of the alpha-olefin monomer units is 0-6 mole %, preferably 0-3 mole % based on the moles of the monomer units in the polymer produced in the first step.

The copolymer portion prepared in the second step of the polymerization preferably consists of ethylene monomer units only or consists of propylene monomer units and ethylene monomer units wherein the content of the ethylene monomer units is 10 mole % or more, preferably 20-70 mole % based on the total moles of the monomer units in the polymer produced in the second step or consists of monomer units of propylene, ethylene and an alpha-olefin having 4-6 carbon atoms. The propylene block copolymer contains 10-95% by weight of the copolymer portion based on the weight of the propylene block copolymer.

The content of the second segment in the propylene block copolymer for easy and stable production ranges 10-30% by weight for slurry polymerization, 10-95% by weight, preferably 20-80% by weight, more preferably 30-70% by weight for gas phase polymerization.

In gas phase polymerization, propylene block copolymers containing a large amount of the second segment can be prepared according to the process disclosed in Japanese Patent Application No. 62-256015. Such copolymers are suited for the use where an extremely high impact resistance is requested.

Although the intrinsic viscosity of the second segment in tetraline at 135° C. may be changed depending on the production efficiency, the physical properties of the product powder and the intrinsic viscosity of the first segment, it is approximately 3-8 dl/g for slurry polymerization and 1-5 dl/g for gas phase polymerization.

Specific examples of (B) the solid rubber having a number-average molecular weight of 10,000-200,000 used in the present invention are natural rubbers, cis- or trans-1,4-butadiene rubber, 1,2-butadiene rubber, isoprene rubber, chloroprene rubber, styrene-butadiene random copolymer rubber, styrenebutadiene block copolymer rubber, hydrogenated styrenebutadiene copolymer rubber, styrene-acrylonitrile rubber, isobutylene rubber, isobutylene-acrylic acid ester copolymer rubber, isobutylene-isoprene copolymer rubber, ethylene-alpha-olefin copolymer rubber, ethylene-acrylic acid ester copolymer rubber and the like.

Among these, preferable is an ethylene-alphaolefin copolymer rubber having a number-average molecular weight of 10,000-100,000 and a bound ethylene content of 15-85% by weight. More preferable is an ethylene-alpha-olefin copolymer rubber having a number-average molecular weight of 10,000-100,000 and a bound ethylene content of 40-80% by weight. Specific Examples of the alpha-olefins are propylene, 1-butene, 1-pentene, 1-hexene, 4-methyl-1-pentene, 1-octene and the like and the mixture thereof. The rubber may contain a small content (3% by weight or less) of a nonconjugated diene.

When the number-average molecular weight of the solid rubber (B) exceeds 200,000, the physical properties of the modified polyolefin resin is greatly reduced due to incomplete dispersion of the solid rubber in the polyolefin resin. By contrast when it is less than 10,000, feeding the mixture of the rubber and the polyolefin resin into an extruder for melt-kneading is difficult and the processability and the other physical properties of the product resin are reduced.

The number-average molecular weight of the copolymer rubber was determined by gel permeation chromatography (GPC) under the following conditions:
GPC: Type 150C manufactured by Waters
Column: Shodex 80MA by Showa Denko K.K.
Amount of sample: 300 μl (polymer concentration: 0.2% by weight)
Flow rate: 1 ml/min
Temperature: 135° C.
Solvent: Trichlorobenzene The calibration curve was obtained by a conventional method with a standard polystyrene manufactured by Tosoh Corporation. The data were processed with Data Processor CP-8 Model III Manufactured by Tosoh Corporation.

The unsaturated carboxylic acids used in the present invention as the constituent (C) include acrylic acid, methacrylic acid, maleic acid, itaconic acid, citraconic acid, bicyclo[2,2,1]hepta-5-ene-2,3-dicarboxylic acid (himic acid), bicyclo[2,2,2]octa-5-en-2,3-dicarboxylic acid, 4-methylcyclohexa-4-en-1,2- dicarboxylic acid, 1,2,3,4,5,8,9,10-octahydronaphthalen-2,3-dicarboxylic acid, bicyclo[2,2,1]octa-7-en-2,3,5,6-tetracarboxylic acid, 7-oxabicyclo[2,2,1]hepta-5-en-2,3-dicarboxylic acid and the like. The derivatives thereof are acid anhydride, esters, amides, imides and metal salts. Specific examples thereof are maleic anhydride, itaconic anhydride, citraconic anhydride, bicyclo[2,2,1]hepta-5-ene-2,3-dicarboxylic acid anhydride (himic acid anhydride: NBDA), monoethyl maleate, monomethyl fumarate, monomethyl itaconate, monomethyl fumarate, dimethylaminoethyl methacrylate, dimethylaminopropyl acrylamide, acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide, fumaric N,N-dibutylamide, maleimide, N-butyl maleimide, N-phenyl maleimide, sodium acrylate, sodium methacrylate, potassium acrylate, potassium methacrylate and the like.

The unsaturated epoxy compounds are unsaturated glycidyl esters and unsaturated glycidyl ethers having the following formulas (1) and (2), respectively.

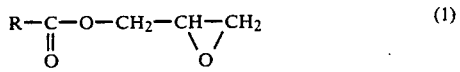

wherein R is a hydrocarbon group of 2-18 carbon atoms containing an ethylenic unsaturated bond.

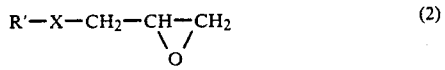

wherein R' is a hydrocarbon group of 2-18 carbon atoms containing an ethylenic unsaturated bond, X is —$CH_2$—O— or

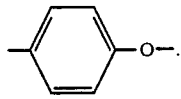

Specific examples of the epoxy compounds are glycidyl acrylate, glycidyl methacrylate, glycidyl itaconate, allyl glycidyl ether, 2-methyl allyl glycidyl ether, styrene p-glycidyl ether and the like.

The above-mentioned unsaturated carboxylic acids, the derivatives thereof and the unsaturated epoxy compounds can be used alone or in admixture of two or more.

Among those mentioned above, maleic anhydride, glycidyl acrylate or glycidyl methacrylate is preferably used.

Although styrene is preferable for the unsaturated aromatic compound (D) used in the present invention, o-methylstyrene, p-methylstyrene, m-methylstyrene, alpha-methylstyrene, vinyltoluene, divinylbenzene and the mixtures thereof can also be used.

The free-radical initiator used in the present invention (E) is not critical and known ones can be used. Specific examples thereof are azo compounds such as 2,2'-azobisisobutyronitrile, 2,2'-azobis(2,4,4-trimethylvaleronitrile) etc.; organic peroxides such as methyl ethyl ketone peroxide, cyclohexanone peroxide, 3,5,5-trimethylcyclohexanone peroxide, 2,2-(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl perodixe, 3,5,5-trimethylhexanoyl peroxide, benzoyl peroxide, t-butyl peracetate, t-butylperoxyisobutyrate, t-butylperoxypivalate, t-butylperoxy-2-ethylhexanoate, t-butylperoxy-3,5,5-trimethylhexanoate, t-butylperoxylaurate, t-butylperoxybenzoate, di-t-butyldiperoxyisophthalate, 2,5-dimethyl-2,5-di(benzoylperoxy)hexane, t-butylperoxymaleic acid, t-butylperoxyisopropylcarbonate, polystyrene peroxide and the like.

In the present invention, the weight ratio of the constituent (A) (polyolefin resin) to the constituent (B) (solid rubber) is 40–99:60–1, preferably 40–95:60–5, more preferably 40–75:60–25.

The constituent (C) is compounded in an amount of 0.1–5 parts by weight, preferably 0.2–3 parts by weight per 100 parts by weight of the mixture of the polyolefin resin (A) and the solid rubber (B).

The unsaturated aromatic compound (D) is compounded in an amount of 0.1–5 parts by weight, preferably 0.2–3 parts by weight per 100 parts by weight of the mixture of the polyolefin resin (A) and the solid rubber (B).

The free-radical initiator (E) is compounded in an amount of 0.01–2 parts by weight, preferably 0.02–1 parts by weight per 100 parts by weight of the mixture of the polyolefin resin (A) and the solid rubber (B).

And the molar ratio of the constituent (C) to the constituent (D) falls in the range of from 1/0.1 inclusive to 1/1 exclusive.

When the content of the solid rubber (B) in the mixture of (A) and (B) exceeds 60% by weight, the mechanical properties of the modified polyolefin resin are reduced. By contrast when it is less than 1% by weight, the physical properties of the product is not improved.

When the amount used of the constituent (C) is less than 0.1 part by weight, no improvement of the qualities of the product is expected. By contrast, when it exceeds 5 parts by weight, the improvement hits the ceiling. And moreover, the product gives out an offensive smell, has a low adhesiveness and acts corrosively to molding apparatuses since it contains a lot of unreacted monomer. Accordingly, such a modified polyolefin resin is undesirable for practical use.

When the amount of the constituent (D) is less than 0.1 part by weight, almost no improvement of the qualities of the product is expected. When it exceeds 5 parts by weight, the improvement hits the ceiling. And moreover, the modified polyolefin resin obtained has a low mechanical strength due to the formation of homopolymers.

When the amount of the constituent (E) is less than 0.01 part by weight, the amount of graft of the constituent (C) is low and a lot of the unreacted constituent (C) remains in the polymer. Accordingly, such a modified polyolefin resin is undesirable for practical use. By contrast, when the amount of the constituent (E) exceeds 2 parts by weight, the amount of graft hits the ceiling. And moreover, the decomposition or crosslinking of the polyolefin resin occurs so frequently that the melt fluidity changes drastically during the modification. Consequently, such a modified polyolefin resin is undesirable for practical use.

When the molar ratio of (C)/(D) is more than 1/0.1, the modified polyolefin resin satisfying the objects of the present invention cannot be obtained due to low improvement in amount of graft of the constituent (C) and drastic change of the melt flow rate. The ratio less than 1/1 causes reduction of the adhesiveness, affinity for coating and resistance to falling off of the coating of the modified polyolefin resin produced. Accordingly, such a modified polyolefin resin is undesirable for practical use.

The melt flow rate of the modified polyolefin resin produced under the above-restricted conditions falls in the range of 0.1-100 g/10 min, preferably 0.5-50 g/10, more preferably 1-30 g/10 min, more preferably 1-20 g/10 min.

The modified polyolefin resin of the present invention can be produced by melt-kneading (A) a specific polyolefin resin, (B) a specific solid rubber, (C) at least one compound selected from the group consisting of unsaturated carboxylic acids, derivatives thereof and unsaturated epoxy compounds, (D) an unsaturated aromatic compound and (E) a free-radical initiator with an extruder, a Banbury mixer or a kneader at 150°-300° C., preferably at 190°-280° C. for 0.3-10 minutes retention, preferably 0.5-5 minutes retention.

For industrial purpose, continuous production process is advantageous. The process is carried out with a single screw or twin screw extruder while maintaining the vent holes vacuous and therefrom removing by-products such as unreacted constituents (C), (D) and (E), the oligomers thereof and decomposition products. Although the reaction may be carried out in air, it is preferable to carry out the reaction under inert gas atmosphere such as in nitrogen or carbon dioxide. In order to thoroughly remove trace of the unreacted compounds or the by-products from the modified polyolefin resin produced, the resin may be subjected to a heat treatment at a temperature above 60° C., a solvent extraction or a drawing a vaccum with melting.

If necessary, to the modified polyolefin resin of the present invention can be added antioxidants, heat stabilizers, light stabilizers, nucleating agents, lubricants, antistatic agents, inorganic or organic fillers, inorganic or organic colorants, rust preventives, crosslinking agents, foaming agents, plastisizers, fluorescent agents, surface treating agents, surface brighteners and the like during the modification or the after-treatment.

To the modified polyolefin resin of the present invention thus obtained can be applied a urethane coating without having previously coated a primer. Since the polyolefins provided by the prior art has a non-polar property, it is necessary to coat a primer before the application of the coating. However, the modified polyolefin resin of the present invention, containing polar groups in the molecule by modification, does not require such a treatment. Specific examples of the urethane coatings are acrylic urethanes, polyester urethanes, modified urethanes and the like.

The modified polyolefin resin of the present invention used as an adhesive resin composition itself or can be made into an adhesive resin composition by incorporating a specific magnesium oxide and an unmodified polyolefin resin. The composition can be used as a covering material, a binder or a laminate bonding agent for various substances such as inorganic substances or metals.

The modified polyolefin resin of the present invention can be applied to the polymer alloy uses. Polyolefin resins, particularly polypropylenes, have been widely used for films and domestic appliances and are beginning to be used for automobiles such as for bumpers in combination with rubbers and fillers.

In recent years, the advent of polymer alloys of engineering plastics has increased the demands for alloys having improved qualities. In order to satisfy the demands, which is becoming varied, many researches for improving and developping the qualities of the alloys has been made. For producing the alloy of polypropylene and an engineering plastic of high grade, the polypropylene should contain polar groups in the polymer chain and has the same good properties as ordinary polypropylenes. In view of the situation, the modified polyolefin resin of the present invention can be combined with polypropylene and an engineering plastic for producing polymer alloys.

With the modified polyolefin resin of the present invention, a wide variety of composite materials such as covering materials, laminates, reinforced resins and the like having an excellent adhesiveness can be produced by a conventional production technique. For example, for the production of covering materials or laminates are applied depending on the purpose powder coating such as fluidized bed dip coating, electrostatic coating and flame spray coating, solution coating, extrusion coating, dry lamination, hot pressing, insert molding or a combination thereof. The filled resin and fiber-reinforced resin can be produced by extrusion molding or injection molding.

The following examples serve to give specific illustration of the practice of the present invention but they are not intended in any way to limit the scope of the present invention.

The physical properties of the product were determined as follows:

(1) Melt flow rate

The melt flow rate was determined according to JIS K6758 (same as ASTM D1238). It was measured at 230° C. under a load of 2.16 kg so far as it is not said emphatically.

(2) Flexural Modulus

The test was carried out according to JIS K7203, wherein the Flexural modulus were determined with a sample having a thickness of 3.2 mm, the sample was notched under the conditions of a span length of 50 mm and a loading rate of 1.5 mm/min. The temperature at the measurement was 23° C. so far as it is not said emphatically. When the measurement was carried out at a temperature other than 23° C., the sample was subjected to the measurement after having been conditioned in a constant temperature bath for 30 minutes.

(3) Izod Impact

Izod impact was determined in accordance with JIS K7110. The thickness of the sample was 3.2 mm and the sample was notched. The measurement was carried out at 23° C. and −30° C. When the measurement was carried out at −30° C., the sample was conditioned in a constant temperature bath at −30° C. for 2 hours before the measurement.

(4) Amounts of bound maleic anhydride and glycidyl methacrylate

The amount of bound maleic anhydride in the modified polyolefin resin was determined as follows:

A small amount of the sample of the resin was dissolved in hot xylene. Adding anhydrous acetone thereto gave a precipitate of the purified sample. Then the precipitate was dissolved in xylene again. The resulting solution was titrated by methanol solution of sodium hydroxide with phenolphthalein as an indicator at an elevated temperature (110°-120° C.).

The amount of bound glycidyl methacrylate was determined as follows:

The epoxy contained in a resin was opened by dissolving the resin in a xylene-methanol-hydrochloric acid solution. The excess hydrochloric acid was back titrated by a methanol solution of $NaOCH_3$ elevated temperature (110°-120° C.) with phenolphthalein as an indicator.

(5) Bound ethylene content

The bound ethylene content was determined by applying a calibration curve to the absorbance data at the frequencies assigned to methyl ($—CH_3$) and methylene ($—CH_2—$) appearing in the infrared spectrum of a pressed sheet previously prepared.

(6) Initial degree of adhesion of coating layer

The surface of the sample was washed with vaporized 1,1,1-trichloroethane (74° C.) for 30 seconds and then dried at room temperature. A urethane coating (Flexthane #101 manufactured by Nippon Bee Chemical Co.) was directly spray-coated onto the sample. The sample was baking finished in a 120° C. oven for 30 minutes.

The surface of the coated sample thus obtained was cut with a razor into 100 even squares (10×10) of 2 mm square. On the surface, a pressure sensitive adhesive tape of 24 mm width (Cellotape ® manufactured by Nichiban Co., Ltd.) was pressed with a finger. Thereafter the tape was immediately peeled off from the surface with pinching the edge of the tape The percentage of the retention was determined by counting the remaining squares.

Practically, 95% or more of the retention is required.

The above sample for determining the physical property data was prepared according to the following injection molding conditions so far as it is not said emphatically.

The resin was dried at 120° C. for 2 hours with a hot-air dryer. Thereafter it was injection molded with the IS150 E-V type injection molding machine manufactured by Toshiba Machine Co., Ltd. at a molding temperature of 240° C. and a mold-cooling temperature of 70° C. for 15 seconds for injection and 30 seconds for cooling.

EXAMPLE 1

With a Henschel mixer were uniformly mixed 100 parts by weight of a mixture consisting of 70% by weight of a crystalline propylene-ethylene block copolymer having a melt flow rate of 3 g/10 min and a bound ethylene content of 9.7% by weight (as a polyolefin resin (A), hereinafter referred to as A-1) and 30% by weight of an ethylene-propylene copolymer rubber having a number-average molecular weight of 55,000 and a bound ethylene content of 78% by weight (as a solid rubber (B), hereinafter referred to as B-1), 1.5 parts by weight of maleic anhydride (C), 0.5 part by weight of styrene (D), 0.08 part by weight of 1,3-bis(t-butyl-peroxyisopropyl)benzene (as a free-radical initiator (E), Sanperox ®-TY1.3 manufactured by Sanken Kako Co., Ltd.) and 0.1 part by weight of Irganox ® 1010 as a stabilizer (manufactured by Ciba-Geigy Ltd.). Thereafter the mixture was melt-kneaded with a twin screw type extruder having 120 mm-diameter screws at 270° C. for an average retention time of 0.8 minutes to obtain a graft-modified polyolefin resin. The resin had a melt flow rate of 4.5 g/10 min and an amount of bound maleic anhydride of 0.59% by weight.

Table 1 shows the results.

EXAMPLES 2 and 3

The same procedure as in Example 1 was repeated except that the weight ratio of the polyolefin resin (A) to the solid rubber (B) was changed to those shown in Table 1. Table 1 shows the results.

COMPARATIVE EXAMPLE 1

The same procedure as in Example 1 was repeated except that the solid rubber was not used. The results are shown in Table 1.

EXAMPLE 4

The same procedure as in Examples 1-3 was repeated except that the polyolefin resin was replaced by a crystalline polypropylene having a melt flow rate of 1.5 g/10 min (hereinafter referred to as A-2) and that the free-radical initiator (E) was used in an amount of 0.048 part by weight. Table 1 shows the results.

COMPARATIVE EXAMPLES 2 and 3

The same procedure as in Example 4 was repeated except that the solid rubber (B) or styrene (D) was not used. Table 1 shows the results.

COMPARATIVE EXAMPLE 4

The same procedure as in Example 4 was repeated except that the free-radical initiator (E) was not used. Table 1 shows the results.

COMPARATIVE EXAMPLE 5

The same procedure as in Example 4 was repeated except that the free-radical initiator (E) was not used and that styrene (D) was used in an amount of 1.8 parts by weight. Table 1 shows the results.

COMPARATIVE EXAMPLE 6

The same procedure as in Example 4 was repeated except that styrene (D) was used in an amount of 1.8 part by weight. Table 1 shows the results.

COMPARATIVE EXAMPLE 7

The same procedure as in Example 4 was repeated except that maleic anhydride (C) and styrene (D) were used in amounts of 2.0 parts by weight and 2.4 parts by weight, respectively. Table 1 shows the results.

TABLE 1

| | Example 1 | Example 2 | Example 3 | Comparative Example 1 | Example 4 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Mixing ratio | | | | | | | | | | | |

TABLE 1-continued

|  | Example 1 | Example 2 | Example 3 | Comparative Example 1 | Example 4 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| (part by weight) | | | | | | | | | | | |
| Propylene-ethylene block copolymer (A-1) | 70 | 80 | 90 | 100 | — | — | — | — | — | — | — |
| Crystalline polypropylene (A-2) | — | — | — | — | 70 | 100 | 70 | 70 | 70 | 70 | 70 |
| Ethylene-propylene copolymer rubber (B-1) | 30 | 20 | 10 | — | 30 | — | 30 | 30 | 30 | 30 | 30 |
| Maleic anhydride (C) | 1.5 | 1.5 | 1.5 | 1.5 | 1.5 | 1.5 | 1.5 | 1.5 | 1.5 | 1.5 | 2.0 |
| Styrene (D) | 0.5 | 0.5 | 0.5 | 0.5 | 0.5 | 0.5 | — | 0.5 | 1.8 | 1.8 | 2.4 |
| Synperox ® TY-1.3 (E) | 0.08 | 0.08 | 0.08 | 0.08 | 0.048 | 0.048 | 0.048 | — | — | 0.048 | 0.048 |
| Irganox ® 1010 | 0.1 | 0.1 | 0.1 | 0.1 | 0.1 | 0.1 | 0.1 | 0.1 | 0.1 | 0.1 | 0.1 |
| Analytical data | | | | | | | | | | | |
| Amount of bound maleic anhydride (wt. %) | 0.59 | 0.50 | 0.45 | 0.29 | 0.40 | 0.15 | 0.21 | 0.06 | 0.15 | 0.39 | 0.50 |
| Melt flow rate (g/10 min) *1 | 4.5 | 4.7 | 5.8 | 6.9 | 4.3 | 28 | 39 | 6.5 | 2.7 | 4.3 | 3.8 |
| Initial degree of adhesion of coating layer (%) | 100 | 100 | 100 | 90 | 95 | 0 | 72 | 70 | 10 | 30 | 65 |

*1 The measurement was carried out according to ASTM D 1238 at 230°C. under a load of 2.16 kg.

EXAMPLES 5 and 6

The same procedure as in Example 4 was repeated except that the weight ratio of the crystalline polypropylene (A) to the solid rubber (B) and the amount of maleic anhydride compounded were changed. Table 2 shows the results.

EXAMPLE 7

The same procedure as in Example 5 was repeated except that the free-radical initiator (E) was used in an amount of 0.0024 part by weight and that the melt-kneading was carried out with a single screw extruder having a 30 mm-diameter screw at 230° C. for an average retention time of 1.8 minutes. Table 2 shows the results.

COMPARATIVE EXAMPLES 8 and 9

The same procedure as in Example 7 was repeated except that styrene (D) was not used or that the solid rubber (B) and styrene (D) were not used. Table 2 shows the results.

EXAMPLES 8 and 10

The same procedures as in Example 7 was repeated except that the compounding ratio of the constituents (A), (B), (C) and (D) was changed as shown in Table 2. Table 2 also shows the results.

EXAMPLE 11

The same procedure as in Example 8 was repeated except that a mixture of the constituents (A) and (B) containing 30% by weight of an ethylenepropylene copolymer rubber having a number-average molecular weight of 49,000 and a bound ethylene content of 47% by weight (as a solid rubber, B-2) and 1.5 parts by weight of maleic anhydride (C) were used. Table 2 shows the results.

EXAMPLE 12 AND COMPARATIVE EXAMPLE 10

A modified polyolefin resin was prepared starting from the following propylene block copolymer.

A highly crystalline propylene ethylene block copolymer (A-3) was prepared according to the slurry polymerization process disclosed in JP-A-60-228504. The copolymer had the following properties:
Melt flow rate: 3.0 g/10 min,
Intrinsic viscosity in tetralin at 135° C.: 3.19 dl/g,
Content of the propylene homopolymer portion, the first segment produced in the first step of the polymerization (hereinafter referred to as the P portion): 74% by weight,
Content of the ethylene-propylene copolymer portion, the second segment produced in the second step of the polymerization (hereinafter referred to as the EP portion): 26% by weight,
Intrinsic viscosity of the P portion in tetralin at 135° C.: 1.64 dl/g,
20° C. Cold xylene soluble of the P portion: 1.6% by weight,
Boiling heptane soluble of the P portion: 4.6% by weight,
Isotactic pentad of the boiling heptane insoluble of the P portion: 0.975,
Intrinsic viscosity of the EP portion in tetralin at 135° C.: 7.58 dl/g, and
Weight ratio of ethylene/propylene in the EP portion 48/52.

The copolymer was modified in the following manner:
With a Henschel mixer were uniformly mixed 100 parts by weight of a mixture consisting of 70% by weight of the above propylene block copolymer and 30% by weight of the solid rubber (B-1), 1.5 parts by weight of maleic anhydride, 0.5 part by weight of styrene (D), 0.08 part by weight of a free-radical initiator (E) and 0.1 part by weight of Irganox ® 1010 (manufactured by Ciba-Geigy Ltd.) as a stabilizer. Thereafter the mixture was melt-kneaded with a twin screw type extruder (TEX 44 SS-30BW-2V manufactured by Nippon Seiko K. K.) at a kneading temperature of 220° C. for an average retention time of 1.5 minutes to obtain a modified polyolefin resin. The resin had a melt flow rate of 4.5 g/10 min and an amount of bound maleic anhydride of 0.58% by weight (Example 12).

The same procedure as in above was repeated except that styrene was not used. The resulting resin had a melt flow rate of 25 g/10 min and an amount of bound maleic anhydride of 0.30% by weight (Comparative Example 10).

EXAMPLE 13

A modified polyolefin resin was prepared starting from the following propylene-ethylene block copolymer (A-4).

A highly crystalline propylene-ethylene block copolymer (A-4) was prepared according to the gas phase polymerization process disclosed in JP-A-62- 287917. The copolymer had the following properties:
Melt flow rate: 1.3 g/10 min,
Intrinsic viscosity in tetralin at 135° C.: 2.59 dl/g,
Content of the propylene homopolymer portion, the first segment produced in the first step of the polymerization (hereinafter referred to as the P portion): 69% by weight,
Content of the ethylene-propylene copolymer portion, the second segment produced in the second step of the polymerization (hereinafter referred to as the EP portion): 31% by weight,
Intrinsic viscosity of the P portion in tetralin at 135° C.: 2.16 dl/g,
20° C. Cold xylene soluble of the P portion: 1.0% by weight,
Boiling heptane soluble of the P portion: 4.4% by weight,
Isotactic pentad of the boiling heptane insoluble of the P portion: 0.975,
Intrinsic viscosity of the EP portion in tetralin at 135° C.: 3.55 dl/g, and
Weight ratio of ethylene/propylene in the EP portion: 27/73

With the mixture of the constituents (A) and (B) consisting of 70% by weight of the above-prepared propylene-ethylene block copolymer and 30% by weight of the solid rubber (B-1), the same procedure as in Example 12 was repeated to obtain a modified polyolefin resin. The resin had a melt flow rate of 4.5 g/10 min and an amount of bound maleic anhydride of 0.59% by weight.

isotactic pentad of boiling heptane insoluble of 0.955. It was modified in the following manner;

With a Henschel mixer were uniformly mixed 100 parts by weight of a mixture consisting of 70% by weight of the crystalline polypropylene (A-5) and 30% by weight of an ethylene-propylene copolymer rubber, 1.5 parts by weight of maleic anhydride (C), 0.5 part by weight of styrene (D), 0.048 part by weight of a free-radical initiator (E) and 0.1 part by weight of Irganox ® 1010 (manufactured by Ciba-Geigy Ltd.). Thereafter the mixture was melt-kneaded with a twin screw type extruder (TEX 44 SS-30BW-2V manufactured by Nippon Seiko K. K.) at a kneading temperature of 220° C. for an average retention time of 1.5 minutes to obtain a modified polyolefin resin. The resin had a melt flow rate of 4.2 g/10 min and an amount of bound maleic anhydride of 0.40% by weight (Example 14).

The same procedure as in Example 14 was repeated except styrene was not used. The resin obtained had a melt flow rate of 38 g/10 min and an amount of bound maleic anhydride of 0.21% by weight (Comparative Example 11).

EXAMPLE 15

A modified polyolefin resin was prepared as follows:
A highly crystalline polypropylene (hereinafter referred to as A-6) was prepared according to the slurry polymerization process disclosed in JP-A-60-28504. The polypropylene had an intrinsic viscosity in tetralin at 135° C. of 2.42 dl/g, a melt flow rate of 1.6 g/10 min, a 20° C. xylene soluble of 0.6% by weight, a boiling heptane soluble of 2.9% by weight and an isotactic pentad of boiling heptane insoluble of 0.980. Modifying the polypropylene in the same manner as in Example 14 gave a highly crystalline modified polypropylene. It had a melt flow rate of 4.2 g/10 min and an amount of bound maleic anhydride of 0.40% by weight.

The results shows that the modified resin obtained from the highly crystalline polypropylene has an improved flexural modulus, good stiffnes and heat resistance although the modified resin obtained from the ordinary polypropylene shows good properties (Example 14).

COMPARATIVE EXAMPLES 12 TO 14

The modified polyolefin resins were prepared in the same manner as in Example 7 with the same starting materials as in Example 15 but the compounding

TABLE 2

| | Example 5 | Example 6 | Example 7 | Comparative Example 8 | Comparative Example 9 | Example 8 | Example 9 | Example 10 | Example 11 |
|---|---|---|---|---|---|---|---|---|---|
| Mixing ratio (part of weight) | | | | | | | | | |
| Crystalline polypropylene (A-2) | 80 | 90 | 80 | 80 | 100 | 50 | 50 | 50 | 70 |
| Ethylene-propylene copolymer rubber (B-1) | 20 | 10 | 20 | 20 | — | 50 | 50 | 50 | — |
| Ethylene-propylene copolymer rubber (B-2) | — | — | — | — | — | — | — | — | 30 |
| Maleic anhydride (C) | 1.0 | 1.0 | 1.0 | 1.0 | 1.0 | 1.0 | 1.0 | 2.0 | 1.5 |
| Styrene (D)     (D) | 0.5 | 0.5 | 0.5 | — | — | 0.5 | 1.0 | 1.0 | 0.5 |
| Sanperox ® TY-1 · 3 (E) | 0.048 | 0.048 | 0.0024 | 0.0048 | 0.048 | 0.048 | 0.048 | 0.048 | 0.048 |
| Irganox ® 1010 | 0.1 | 0.1 | 0.1 | 0.1 | 0.1 | 0.1 | 0.1 | 0.1 | 0.1 |
| Analytical data | | | | | | | | | |
| Amount of bound maleic anhydride (wt. %) | 0.29 | 0.23 | 0.21 | 0.20 | 0.08 | 0.32 | 0.33 | 0.48 | 0.35 |
| Melt flow rate (g/10 min) | 7.1 | 11 | 5.6 | 47 | 100 | 4.5 | 3.0 | 2.1 | 5.3 |

EXAMPLE 14 AND COMPARATIVE EXAMPLE 11

A modified polyolefin resin was prepared as follows:
A crystalline polypropylene (A-5) was prepared according to the slurry polymerization process disclosed in JP-A-60-28405. The polypropylene had a melt flow rate of 1.3 g/10 min, an intrinsic viscosity in tetralin at 135° C. of 2.45 dl/g, a 20° C. xylene soluble of 2.9% by weight, a boiling heptane soluble of 6.7% by weight, an amounts thereof were changed as shown in Table 3. Table 3 shows the results.

EXAMPLE 16 AND COMPARATIVE EXAMPLE 15

The same procedure as in Example 15 was repeated except that maleic anhydride was replaced by glycidyl methacrylate (C-1) to obtain a modified polyolefin resin. The resin had a melt flow rate of 18 g/10 min and an amount of bound glycidyl methacrylate of 0.15% by weight (Example 16).

g/10 min and an amount of bound glycidyl methacrylate of 0.07% by weight (Comparative Example 15).

EXAMPLES 17-20 AND COMPARATIVE EXAMPLE 16

The same procedure as in Example 15 was repeated except that the mixing ratio of maleic anhydride (C) and styrene were changed as shown in Table 4.

Table 4 shows the results. It also contains the data of Izod impact of Example 15 and Comparative Example 14 for the comparison.

TABLE 3

|  | Example 12 | Comparative Example 10 | Example 13 | Example 14 | Comparative Example 11 | Example 15 | Comparative Example 12 | Comparative Example 13 | Comparative Example 14 | Example 16 | Comparative Example 15 |
|---|---|---|---|---|---|---|---|---|---|---|---|
| Mixing ratio (part by weight) | | | | | | | | | | | |
| Highly crystalline propylene ethylene block copolymer (A-3) | 70 | 70 | — | — | — | — | — | — | — | — | — |
| Highly crystalline propylene copolymer (A-4) | — | — | 70 | — | — | — | — | — | — | — | — |
| Crystalline Polypropylene (A-5) | — | — | — | 70 | 70 | — | — | — | — | — | — |
| Highly crystalline polypropylene (A-6) | — | — | — | — | — | 70 | 70 | 70 | 70 | 70 | 70 |
| Ethylene-propylene copolymer rubber (B-1) | 30 | 30 | 30 | 30 | 30 | 30 | 30 | 30 | 30 | 30 | 30 |
| Maleic anhydride (C) | 1.5 | 1.5 | 1.5 | 1.5 | 1.5 | 1.5 | 1.5 | 1.5 | 1.5 | — | — |
| Glycidyl methacrylate (C-1) | — | — | — | — | — | — | — | — | — | 1.5 | 1.5 |
| Styrene (D) | 0.5 | — | 0.5 | 0.5 | — | 0.5 | 0.5 | 1.8 | 1.8 | 0.5 | — |
| Sanperox ® TY-1·3 (E) | 0.08 | 0.08 | 0.08 | 0.048 | 0.048 | 0.048 | — | — | 0.048 | 0.048 | 0.048 |
| Irganox ® 1010 | 0.1 | 0.1 | 0.1 | 0.1 | 0.1 | 0.1 | 0.1 | 0.1 | 0.1 | 0.1 | 0.1 |
| Analytical data | | | | | | | | | | | |
| Amount of bound maleic anhydride (wt. %) | 0.58 | 0.30 | 0.59 | 0.40 | 0.21 | 0.40 | 0.07 | 0.15 | 0.38 | — | — |
| Amount of bound glycidyl methacrylate (wt. %) | — | — | — | — | — | — | — | — | — | 0.15 | 0.07 |
| Melt flow rate (g/10 min) | 4.5 | 25 | 4.5 | 4.2 | 38 | 4.2 | 6.5 | 2.8 | 3.8 | 18 | 35 |
| Initial degree of adhesion of coating layer (%) | 100 | 90 | 100 | 100 | 70 | 100 | 70 | 10 | 35 | 95 | 30 |
| Flexural modulus (kgf/cm²) (23° C.) | — | — | — | 8500 | — | 9200 | — | — | — | — | — |

TABLE 4

|  | Example 17 | Example 18 | Example 19 | Example 20 | Comparative Example 16 | Example 15 | Comparative Example 14 |
|---|---|---|---|---|---|---|---|
| Mixing ratio (part by weight) | | | | | | | |
| Highly crystalline propylene-ethylene block copolymer (A-6) | 70 | 70 | 70 | 70 | 70 | 70 | 70 |
| Ethylene-propylene copolymer rubber (B-1) | 30 | 30 | 30 | 30 | 30 | 30 | 30 |
| Maleic anhydride (C) | 1.5 | 1.5 | 1.5 | 1.5 | 1.5 | 1.5 | 1.5 |
| Styrene (D) | 0.3 | 0.75 | 1.05 | 1.35 | — | 0.5 | 1.8 |
| Sanperox ® TY-1·3 (E) | 0.048 | 0.048 | 0.048 | 0.048 | 0.048 | 0.048 | 0.048 |
| Irg. ® 1010 | 0.1 | 0.1 | 0.1 | 0.1 | 0.1 | 0.1 | 0.1 |
| Molar ratio of (C)/(D) | 1/0.19 | 1/0.47 | 1/0.66 | 1/0.85 | 1/0 | 1/0.31 | 1/1.13 |
| Initial degree of adhesion of coating layer (%) | 92 | 100 | 95 | 82 | 70 | 100 | 35 |
| Izod impact (kg·cm/cm) | | | | | | | |
| (23° C.) | 78 | 85 | 90 | 90 | 73 | 82 | 88 |
| (−30° C.) | 4.9 | 7.0 | 8.1 | 10.3 | 5.2 | 5.8 | 42.1 |

The same procedure as in Example 16 was repeated except that styrene was not used to obtain a modified polyolefin resin. The resin had a melt flow rate of 35

The modified polyolefin resin provided in the above Examples was dissolved in hot xylene and then precipitated with acetone for purification. The infrared spectrum of the precipitate showing the absorption peaks assigned to styrene demonstrated that styrene was grafted on the polyolefin resin as well as maleic anhydride.

Additionally, attributable to the graft of styrene, the modified polyolefin resins of the present invention were more transparent than the resins provided in the above Comparative Examples.

As described above, the modified polyolefin resin of the present invention has the following merits:

(1) The amount of bound unsaturated carboxylic acid, a derivative thereof or unsaturated epoxy compound is high.
(2) The change of the melt flow rate during the modification is small.
(3) The flexural modulus and impact resistance are of high grade.
(4) The transparency is improved due to the graft of unsaturated aromatic monomer.

According to the present invention, there is provided a modified polyolefin resin having the above advantages which has not been able to prepared in the prior art.

What is claimed is:

1. A modified polyolefin resin obtained by melt-kneading a mixture consisting of
   100 parts by weight of a mixture consisting of (A) 40–99% by weight of a polyolefin resin having a melt flow rate of 0.05–60 g/10 min and (B) 60–1% by weight of a solid rubber having a number-average molecular weight of 10,000–200,000,
   (C) 0.1–5 parts by weight of at least one compound selected from the group consisting of unsaturated carboxylic acids, the derivatives thereof and unsaturated epoxy compounds,
   (D) 0.1–5 parts by weight of an unsaturated aromatic compound and
   (E) 0.01–2 parts by weight of a free-radical initiator, the molar ratio of (C)/(D) ranging from 1/0.1 inclusive to 1/1 exclusive.

2. A resin according to claim 1, wherein the constituent (C) is maleic anhydride.

3. A resin according to claim 1, wherein the constituent (C) is glycidyl acrylate or glycidyl methacrylate.

4. A resin according to claim 1, wherein the constituent (D) is styrene.

5. A resin according to claim 1, wherein the constituent (A) is a crystalline polypropylene or a crystalline propylene copolymer.

6. A resin according to claim 1, wherein the constituent (A) is a crystalline propylene-ethylene block copolymer having a bound ethylene content of 3–15% by weight.

7. A modified polypropylene resin according to claim 6, wherein the weight ratio of the constituent (A) to the constituent (B) is 40–95:60–5.

8. A molded article of a modified polypropylene resin coated with a urethane coating which is obtained by applying a urethane coating to a molded article of a modified polypropylene resin according to claim 7.

9. A modified polypropylene resin according to claim 5, wherein the weight ratio of the constituent (A) to the constituent (B) is 40–75:60–25.

10. A molded article of a modified polypropylene resin coated with a urethane coating which is obtained by applying a urethane coating to a molded article of a modified polypropylene resin according to claim 9.

11. A resin according to claim 5, wherein propylene homopolymer portion in the crystalline propylene homopolymer or crystalline propylene copolymer has an isotactic pentad of boiling heptane insoluble of not less than 0.970 and a boiling heptane insoluble of not more than 5.0% by weight based on the weight of the propylene homopolymer portion.

12. A resin according to claim 6, wherein the propylene-ethylene block copolymer is obtained by gas phase polymerization and contains 20–80% by weight of propylene-ethylene copolymer portion and 80–20% by weight of propylene homopolymer portion.

13. A resin according to claim 1, wherein the constituent (B) is an ethylene-alpha-olefin copolymer rubber having a number-average molecular weight of 10,000–100,000.

14. A resin according to claim 1 which has a melt flow rate falling in the range of 0.1–100 g/10 min.

* * * * *